United States Patent

[11] 3,613,488

| [72] | Inventors | Hubert J. Parsons<br>Horseheads;<br>Francis D. Catlin, Horseheads; James Cordier, Erin, all of N.Y. |
|---|---|---|
| [21] | Appl. No. | 854,908 |
| [22] | Filed | Sept. 3, 1969 |
| [45] | Patented | Oct. 19, 1971 |
| [73] | Assignee | Hardinge Brothers Inc.<br>Elmira, N.Y. |

[54] AUTOMATIC POSITIONING DEVICE FOR A LATHE THREADING ATTACHMENT
17 Claims, 13 Drawing Figs.

[52] U.S. Cl. ................................................ 82/5.5
[51] Int. Cl. ................................................ B23b 5/46
[50] Field of Search ................................ 82/5.5, 5; 10/101

[56] References Cited
UNITED STATES PATENTS
2,084,898  6/1937  Eckardt et al. ............... 82/5.5
3,121,357  2/1964  Skoglund et al. ............ 82/5
3,165,769  1/1965  Parsons et al. ............... 82/5.5 X FOREIGN PATENTS
97,882  4/1924  Austria ........................ 82/5.5

*Primary Examiner*—Leonidas Vlachos
*Attorney*—Shlesinger, Arkwright & Garvey

ABSTRACT: A device for automatically positioning a threading attachment for a lathe having a spindle including a lead screw mounted on said spindle; a rotatable bar mounted on said lathe and extending parallel to the spindle; a follower connected with the bar and movable into mesh with the lead screw for imparting lengthwise motion to the bar; a head secured to the bar; a cutting tool mounted on the head; an arm secured to the bar; a bearing supported means on the lathe for supporting the bar; the arm, bar, and head each having operative and inoperative positions; power means connecting the bearing support means to the arm for rotating the arm, bar and head about the axis of the bar between the operative and inoperative positions, and means for actuating the power means.

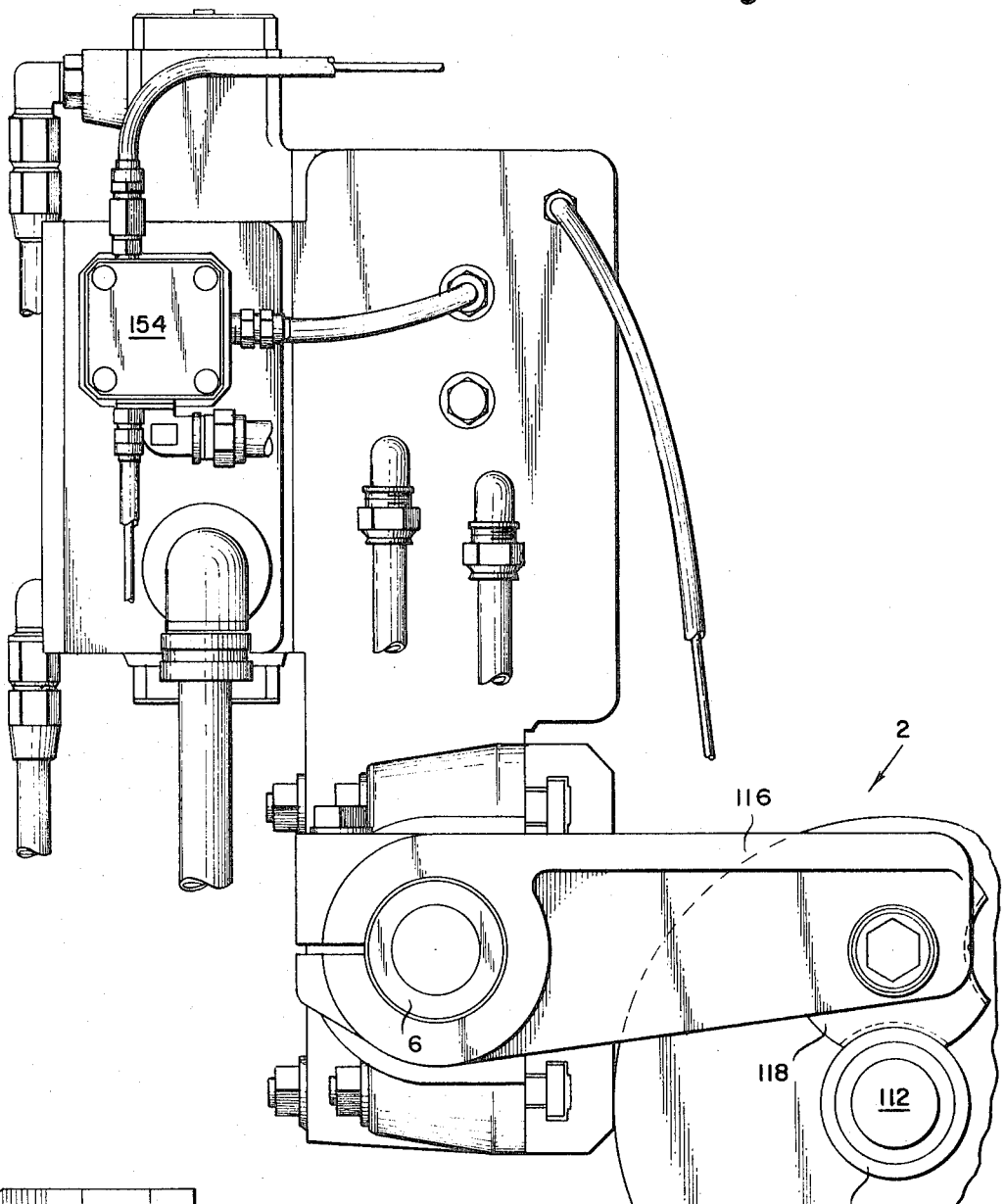
Fig. 4
Fig. 5
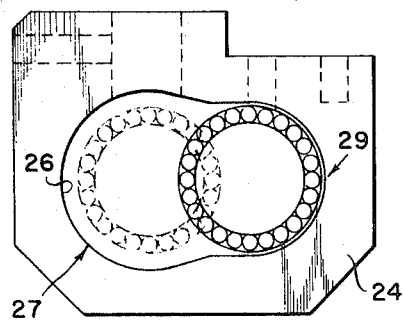

INVENTOR

Hubert J. Parsons
Francis D. Catlin
James Cordier

ATTORNEYS

INVENTORS
Hubert J. Parsons
Francis D. Catlin
James Cordier

BY

ATTORNEYS

AUTOMATIC POSITIONING DEVICE FOR A LATHE THREADING ATTACHMENT

This invention relates to an improved threading attachment which is mounted adjacent a lathe spindle for cooperation therewith, and is an improvement over our U.S. Pat. No. 3,165,769 of H. J. Parsons, et al., "Threading Attachment Pivotally and Slidably Mounted Adjacent the Lathe Spindle" granted Jan. 19, 1965.

HISTORICAL BACKGROUND AND OBJECTS

In U.S. Pat. No. 3,165,769 there is disclosed an attachment for a lathe which enables a cutting head mounted adjacent the lathe to make repeated passes over a rotating work piece while undergoing longitudinal movement in order to cut progressively deeper threads into the work piece. The attachment, after being manually started and brought into position, was controlled by means of mechanical, electrical, and fluid control systems. The manual operation involved included bringing the cutting head into position for a cutting operation, and initiating the cutting cycle by pulling a knob.

It is therefore a primary object of this invention to provide a fully automatic threading attachment for a lathe.

A further object of this inventions is to provide a threading attachment for a lathe which is automatically cyclic in operation and self cancelling.

Yet another object of this invention is to provide a threading attachment for a lathe which requires no manual operation.

A further object of this invention is to provide a threading attachment for a lathe wherein the threading cycle is initiated by means of cooperating electrical and mechanical control elements.

It is another object of this invention to provide a mechanism by means of which the several operations in the cutting of threads of this type are carried on automatically thus relieving the operator of fatigue and increasing the production of work.

Still a further object of this invention is to provide a fully automatic threading attachment for a lathe which requires no supervision by an operator.

Yet a further object of this invention is to provide an automatic threading attachment for a lathe wherein the chasing head is positively clamped into position relative to the work piece.

Another object of this invention is to provide an automatic threading attachment for a lathe wherein the operation of the chasing head is operatively interconnected with the positioning mechanisms so that the chasing head may begin cycling operation when the attachment is brought into the operative position.

Yet another object is to provide a mechanism of this type which is readily adjustable to cut a large variety of different screw threads.

DESCRIPTION OF THE DRAWINGS

These and other objects and inherent advantages will be apparent to those skilled in the art when considered in connection with the accompanying drawings in which:

FIG. 4 is a view along the lines 4—4 of FIG. 1;

FIG. 5 is a view along the lines 5—5 of FIG. 1;

DESCRIPTION OF THE INVENTION

Figure 1:
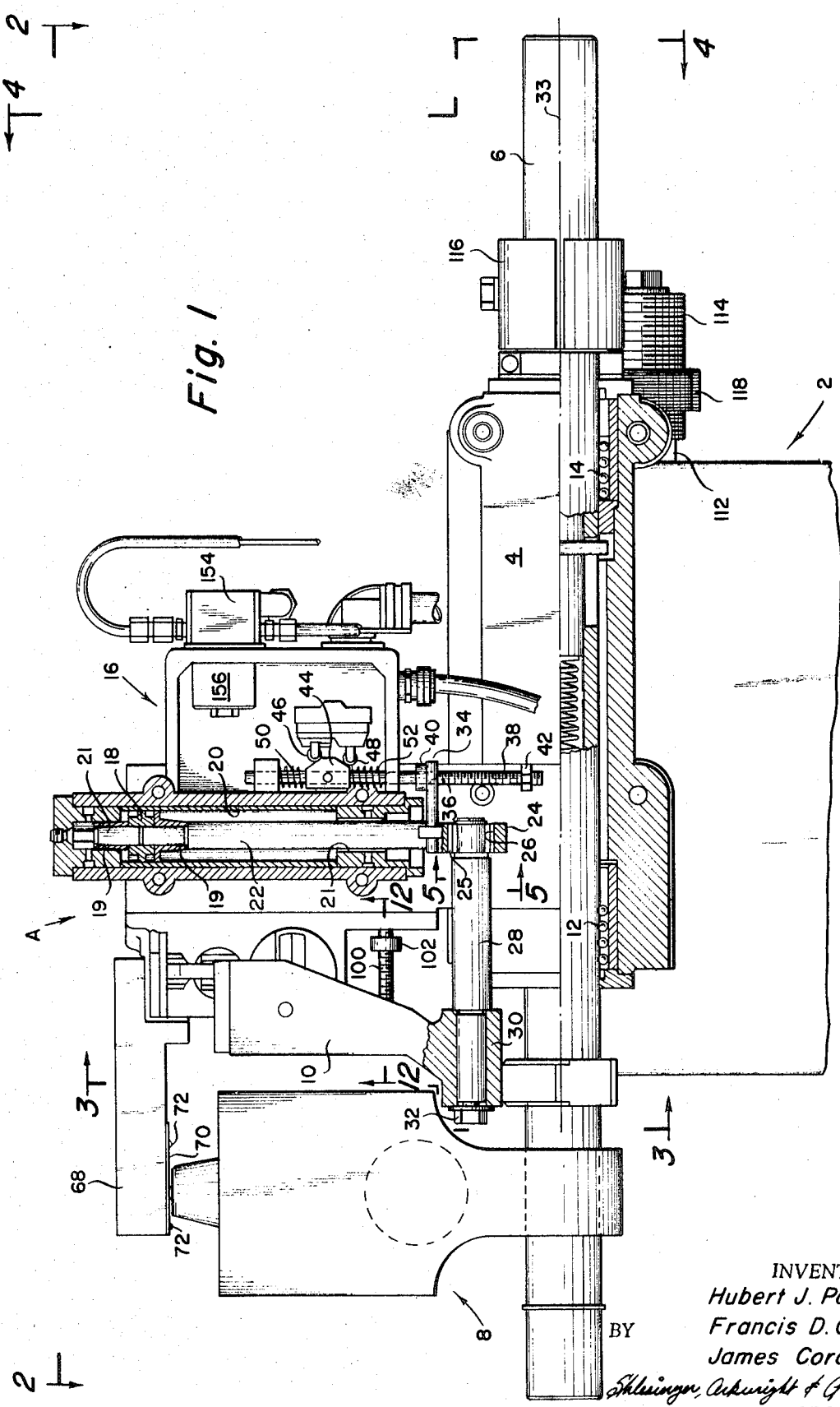
FIG. 1 is an elevational view partially in section illustrating the threading attachment of the invention.
Figure 2:
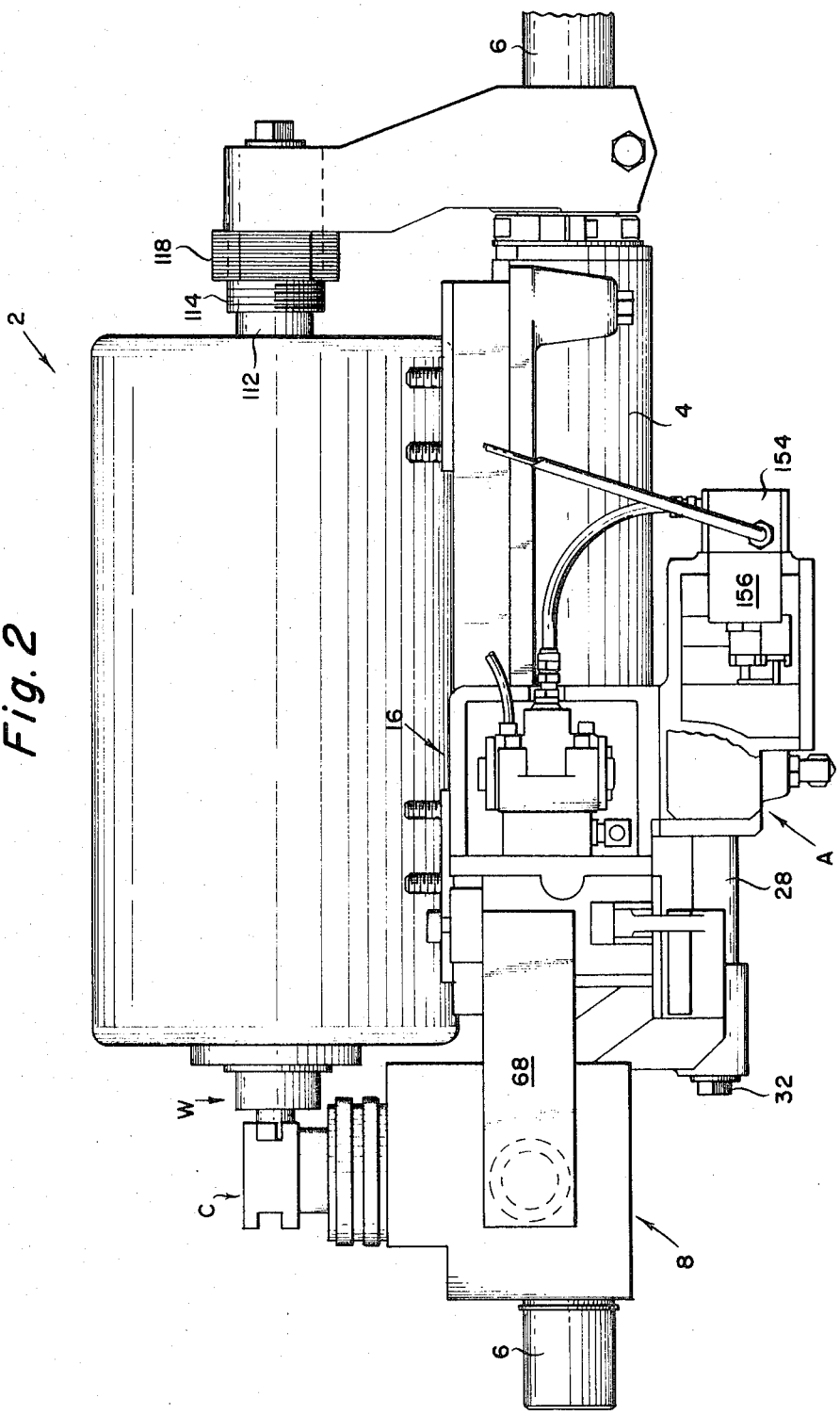
FIG. 2 is a top plan view of the device of FIG. 1.

In FIG. 1 there is shown a lathe having head stock 2 upon which is mounted a bearing support housing 4 for supporting the lathe attachment A adjacent the head stock 2. Supported within housing 4 for rotational and slidable movement is a bar 6 to which is rigidly attached chasing head 8. Also rigidly secured to bar 6 is an arm 10. Bar 6 is supported in housing 4 by bearings 12 and 14 in order to permit the rotational and slidable movement of bar 6. Thus when bar 6 rotates or slides, it carries with it chasing head 8 and arm 10. In this manner chasing head 8 and arm 10 may be moved into or cut of their operative positions.

Mounted on bearing support housing 4 is a housing generally designated 16 which includes a hydraulic piston 18 mounted in cylinder 20. Piston 18 is attached to a piston rod 22 which has secured at its lower most end a yoke 24. Yoke 24 has a configured slot 26 in which needle bearing 25 mounted on the end of rod 28 is positioned. The other end of rod 28 is secured in a collar 30 on arm 10 by means of a nut 32.

Secured to piston rod 22 above and below piston 18 are tapered bushings 19 which serve to cushion the travel of piston 18 and the entire rotating mass at its limits of travel. As the piston 18 approaches either limit of travel, the hydraulic oil being exhausted is forced out around the end of piston rod 22 at each end of cylinder 20 through annular recesses 21, and as the tapered bushing 19 enter either of the recesses 21, oil is gradually metered out at the ends of the travel.

FIG. 5 illustrates the yoke 24 which is attached to piston rod 22. Slot 26, in which rod 28 is carried, is seen to have a greater diameter at end 27 that at end 29. The slot 26 shaped to give a close clearance at the center of the travel of piston 18 and the required greater clearance at the ends of the travel. This close clearance at the center of travel of piston 18 eliminates jump in the motion when the balance point of the rotating mass shifts which it does at approximately 20° from the center position.

Figure 3:
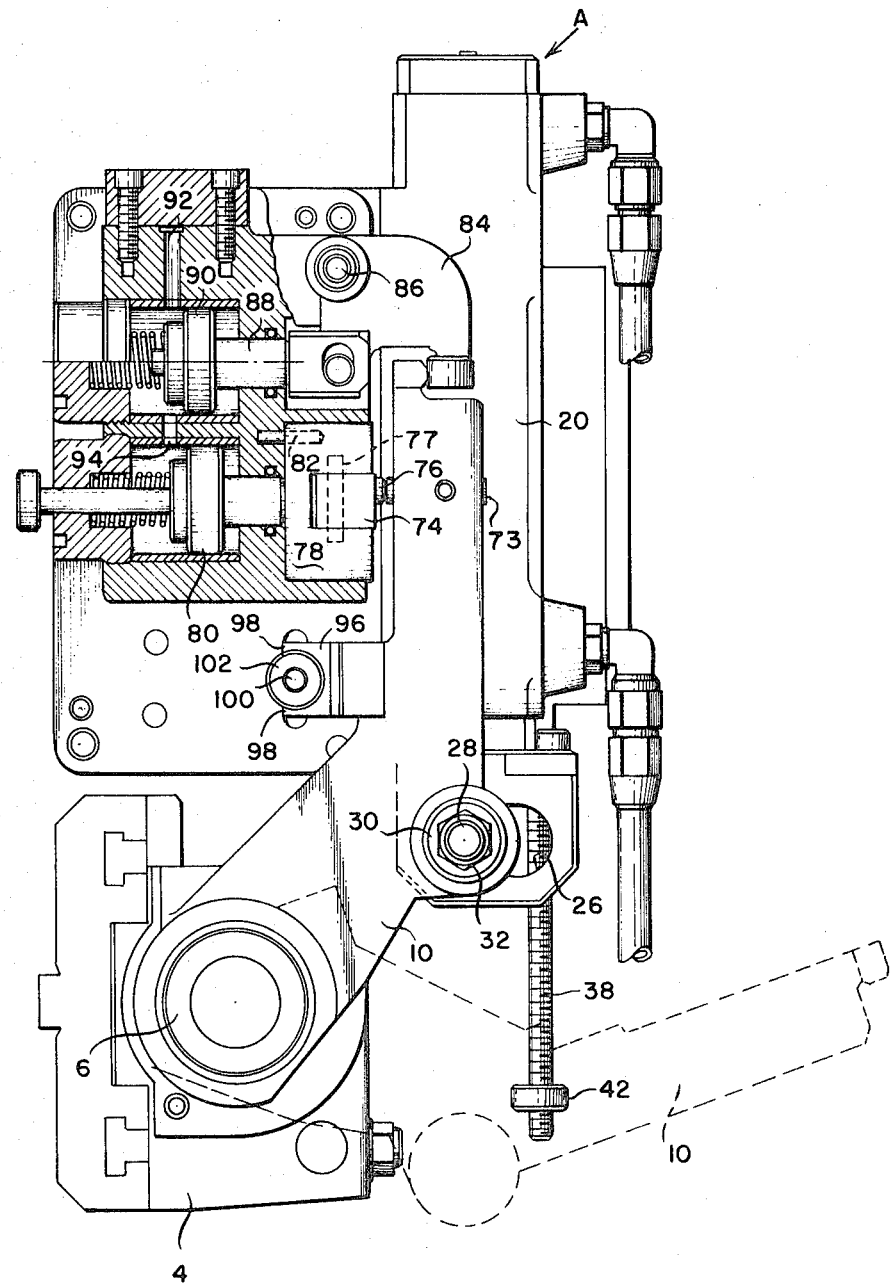
FIG. 3 is a view along the lines 3—3 of FIG. 1.

As best seen in FIG. 3, cylinder 20, rod 28 and arm 10 are offset from the bar 6. Thus when fluid is admitted to the upper portion of piston 18 so as to extend the piston rod, arm 10 is caused to rotate about the axis of bar 6, and since arm 10 is rigidly secured to bar 6, bar 6 and chasing head 8 are also caused to rotate about the axis 33 of the bar 6. Thus rotation of arm 10 is illustrated by the dotted line position of arm 10 in FIG. 3. In this dotted line position, arm 10 is in an operative position. If fluid where admitted to the lower side of piston 18 rod 22 would retract, and arm 10 would return to the solid line position shown in FIG, 3.

Returning to FIG. 1, there is shown a collar 34 mounted on piston rod 22 for movement therewith. Collar 34 includes and aperture 36 through which passes threaded rod 38. Threaded rod 38 has mounted thereon stops 40 and 42 which are engaged by collar 34 at each end of the travel of piston rod 22. Rigidly secured to the rod 38 is a trip block 44 which engages limit switches 46 and 48. Springs 50 and 52 serve to center the trip block 44 and also threaded rod 38. Thus when piston rod 22 is fully extended, collar 34 engages stop 42, and trip block 44 closes limit switch 48.

Also, when piston rod 22 is fully retracted, collar 34 engages stop 40 and trip block 44 closes limit switch 46. Thus an electric signal may be provided at each end of the travel of piston 18.

Figure 6:
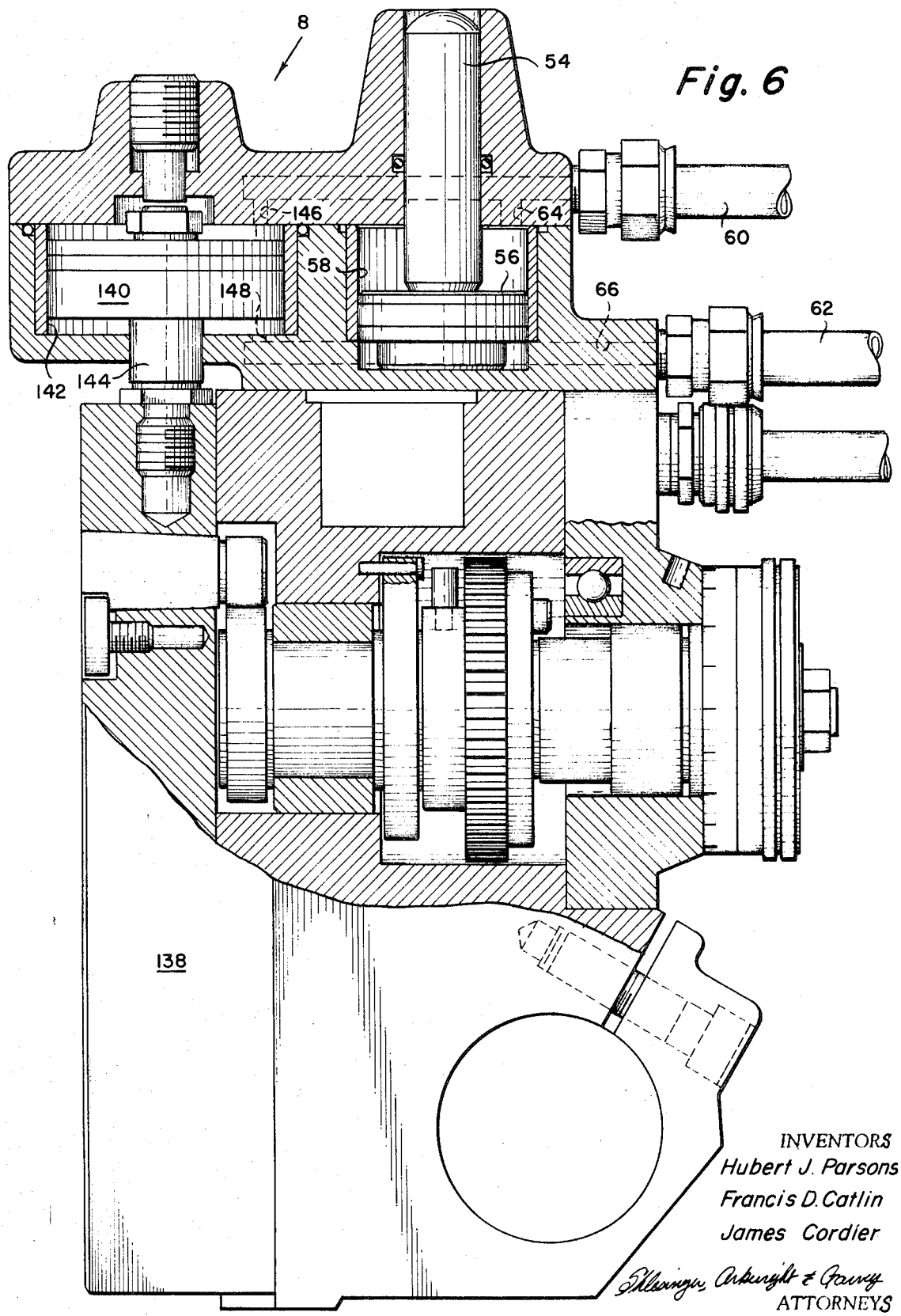
FIG. 6 is a partial sectional view of the chasing head.
Figure 7:
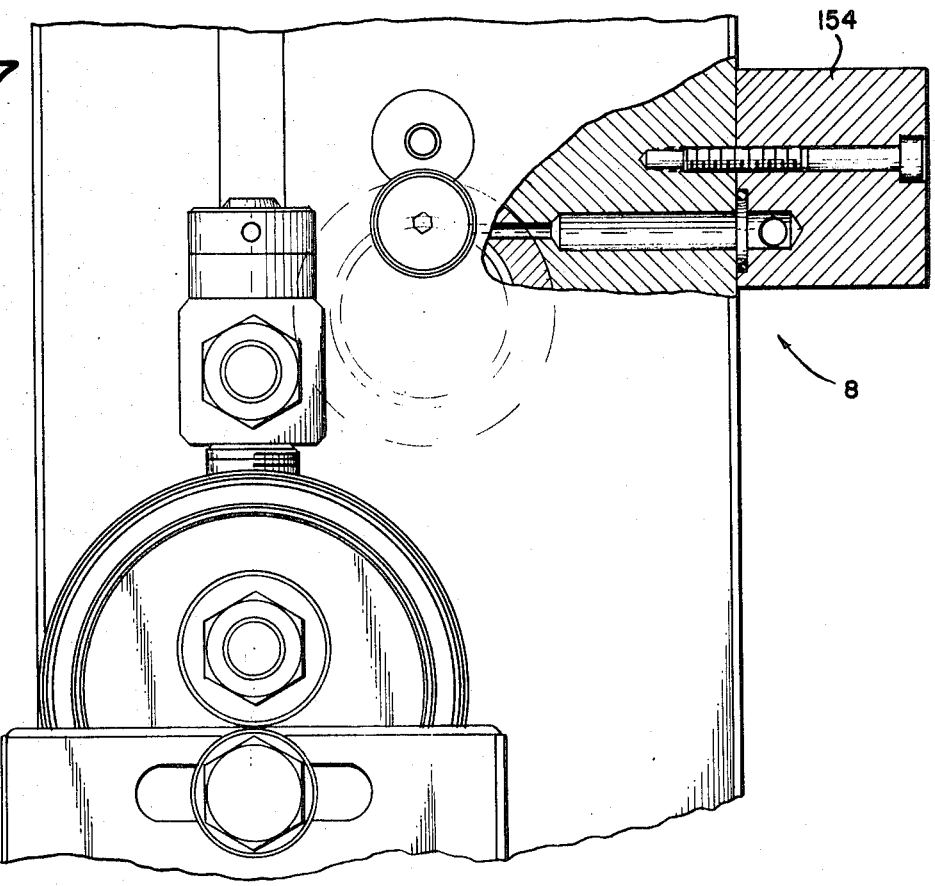
FIG. 7 is a view of a portion of the chasing head control mechanism.
Figure 8:
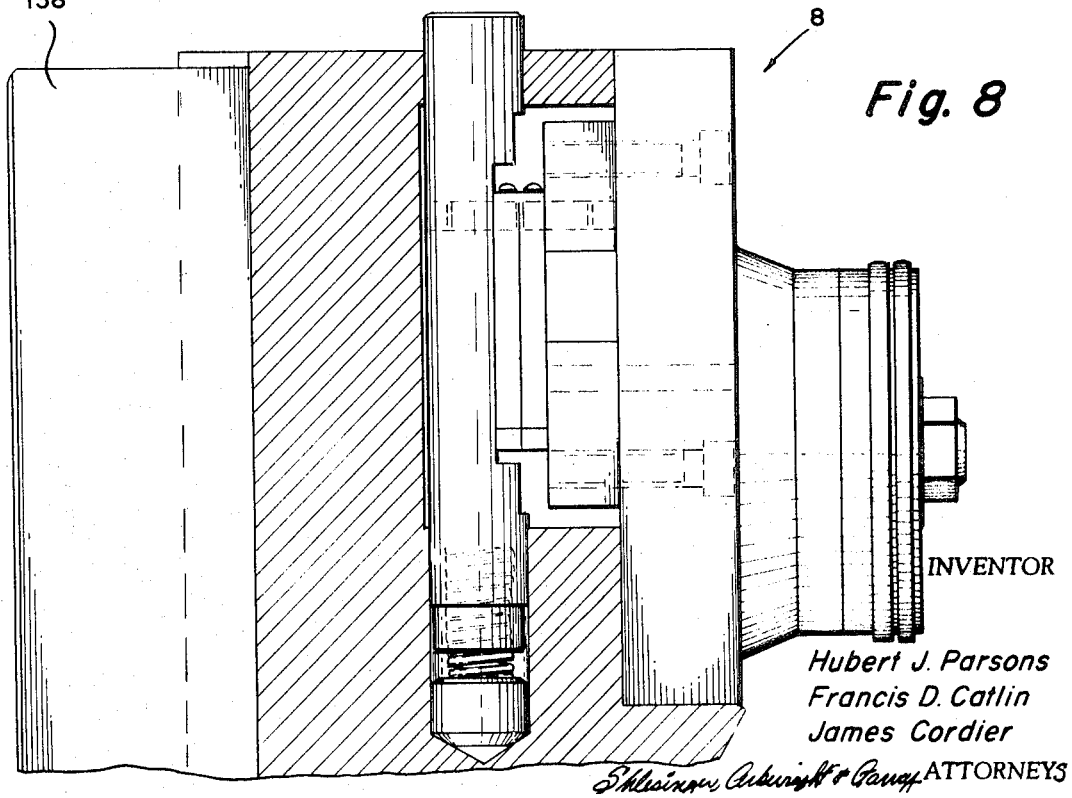
FIG. 8 is a view of another portion of the chasing head control mechanism.

Referring to FIG. 1 and 6, it has been found that it is necessary to clamp the chasing head 8 in position so that the cutter may remain in positive contact with the work piece. This is accomplished by means to be described. In FIG. 6, there is shown the chasing head 8 having a plunger 54 on the upper most portion of the chasing head 8. The plunger 54 is secured to a piston 56 in cylinder 58. Hydraulic fluid under pressure from a source (not shown) is admitted through hoses 60 and 62 and ports 64 and 66 to either side of piston 56. Thus when fluid is admitted through port 66 to the lower side of piston 56, the piston 56 and plunger 54 will raise.

Secured to the housing 16 is a projecting arm 68 having a hardened wear plate 70 secured thereto by means of screws 72 thus when plunger 54 is extended, it will bear against wear plate 70, and the chasing head 8 will be clamped between arm 68 and bar 6, and the cutter C mounted on chasing head 8 will be secured against the workpiece W.

The mechanism which controls admission of fluid to piston 56 will be discussed later.

Referring to FIG. 3, an additional clamping means is shown which clamps arm 10 and bar 6 in their operative positions. The exact operative position is controlled by means of a screw 73 mounted on the arm 10 in position to engage a hardened plate 76 which is of similar material to wear plate 70 . This material may, for example, be made of a cemented carbide material. This plate 76 is mounted on the supporting block 74 which is pivotally mounted by a pivot pin or rod 77 to a block 78 having an extension which is secured to piston 80. A pin 82 serves to connect the block 78 with the housing to permit axial motion of the block 78 and piston 80 but prevent then from rotating. Thus, the axial position of piston 80 determines the operative position of arm 10.

A clamping means is provided for arm 10 and consists of a clamp 84 pivoted at 86, and connected through rod 88 to piston 90. Thus when retracted, piston 90 urges clamp 84 against arm 10 which forces screws 73 against wear plate 76. In this manner arm 10 is positively clamped into its operative position.

Piston 80 and 90 operate simultaneously by means of fluid which is admitted through port 92 and connecting passage 94 to both cylinders.

As best seen in FIG. 3, arm 10 includes a forklike projection 96, the furcations 98 which surround a threaded rod 100. Mounted on rod 100 are two stops 102. As the arm 10 and projection 96 reciprocate, furcations 98 engage stops 102.

Figure 12:
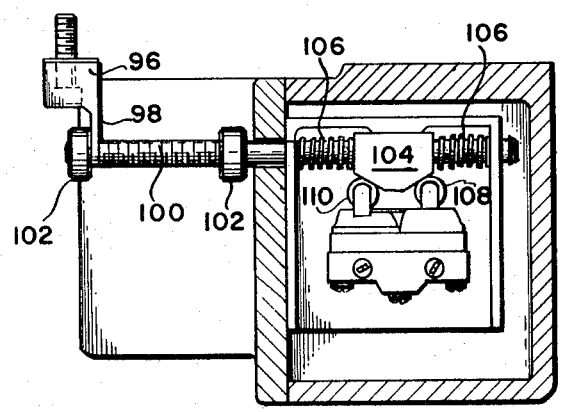
FIG. 12 is a view of an additional portion of the movement control mechanism of the chasing head.
Figure 13:
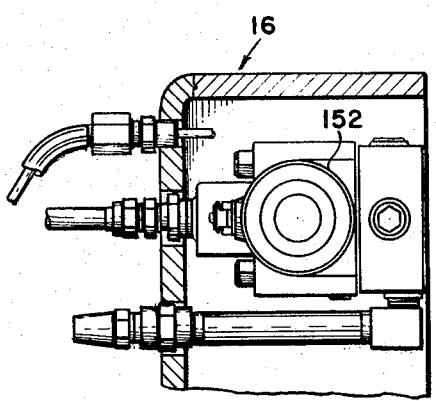
FIG. 13 is a view of a portion of the pneumatic valve system of this invention.

Referring to FIG. 12, there is shown a trip block 104 secured to rod 100, and the rod 100 and trip block 104 centered by means of springs 106. Limit switches 108 and 110 are mounted adjacent trip block 104 so that left or right movement of trip block 104 will close switch 108 or 110. Consequently, as arm 10 and projection 96 slide, furcations 98 will engage stops 102 and signal completion of the travels of arm 10. Since arm 10 is rigidly secured to bar 6, the signals provided by switches 108 and 110 are indicative of the ends of axial travel of bar 6.

Referring to FIG. 4, the means by which bar 6 is reciprocated is shown. Head stock 2 has a spindle 112 with a lead screw 114 mounted thereon. Bar 6 has an arm 116 secured thereto, and a arm 116 has a follower 118 mounted thereon. When follower 118 engages lead screw 114 which is rotating, arm 116 and bar 6 will be longitudinally moved according to the pitch and speed of the lead screw 114. The longitudinal movement of bar 6 is accordingly imparted to arm 10 and chasing head 8.

Figure 9:
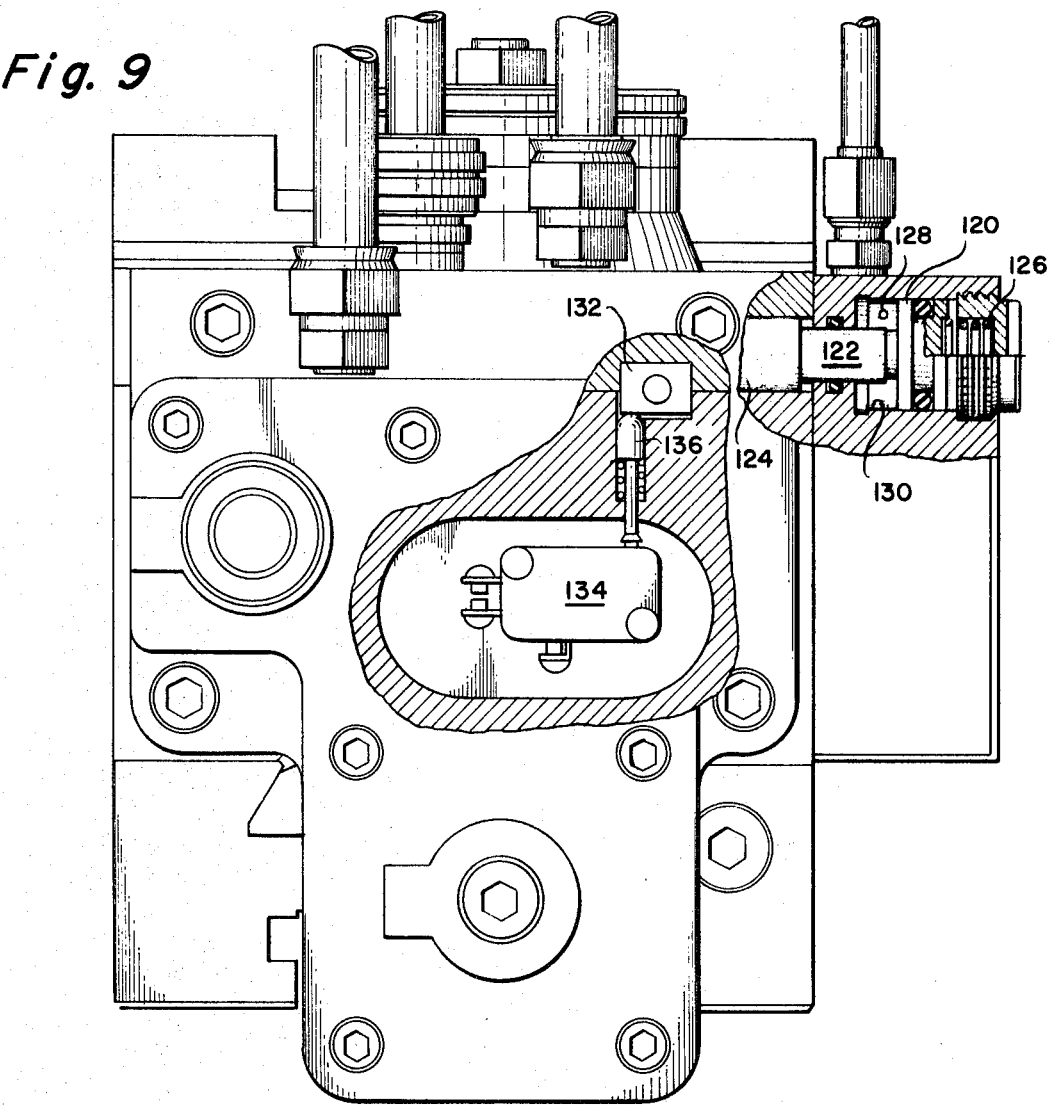
FIG. 9 is a view in partial section of the chasing head.
Figure 10:
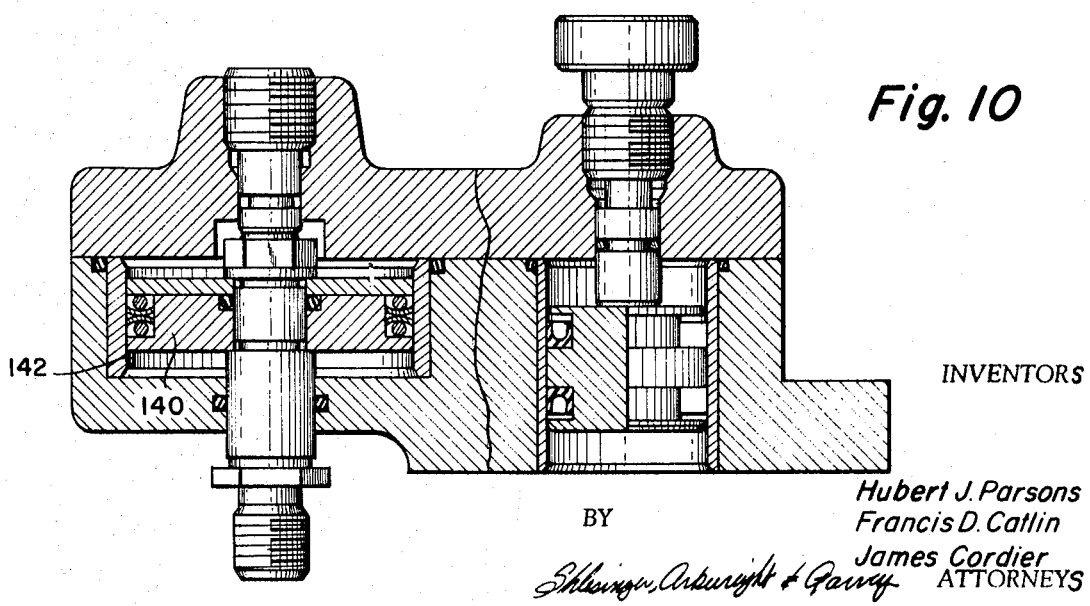
FIG. 10 is a view of another portion of the control mechanism of the chasing head.

A further feature of the present invention is another improvement over Parsons et al., U.S. Pat. No. 3,165,769. In that patent bar 170 must be pulled out by means of knob 187 to initiate the cutting cycle. This manual operation is replaced in the present invention by the mechanism shown in FIG. 9. In FIG. 9 a piston 120 is provided, and includes a plunger 122 which acts on a bar 124 which corresponds to bar 170 of U.S. Pat. No. 3,165,769. A spring 126 is located behind piston 120 and urges plunger 122 left in FIG, 9. When fluid is admitted to cylinder 130 through port 128, piston 120 moves to the right drawing with it bar 124. This permits bar 132 corresponding to bar 166 in U. S. Pat. No. 3,165,769, to move downwardly and close limit switch 134 by means of a pin 136. Switch 134 controls all electric power to the thread cutting mechanism.

As seen in FIG. 6, a slide 138 is mounted on the chasing head assembly, and the cutting member C is secured to this slide 138. In order to urge the cutting member C downwardly against the workpiece W, piston 140 in cylinder 142 is provided. This piston 140 is connected to slide 138 by means of piston rod 144. Fluid is admitted to either side of piston 140 by means of hoses 60 or 62 through ports 146 or 148 to either lower or raise slide 138.

Figure 11:
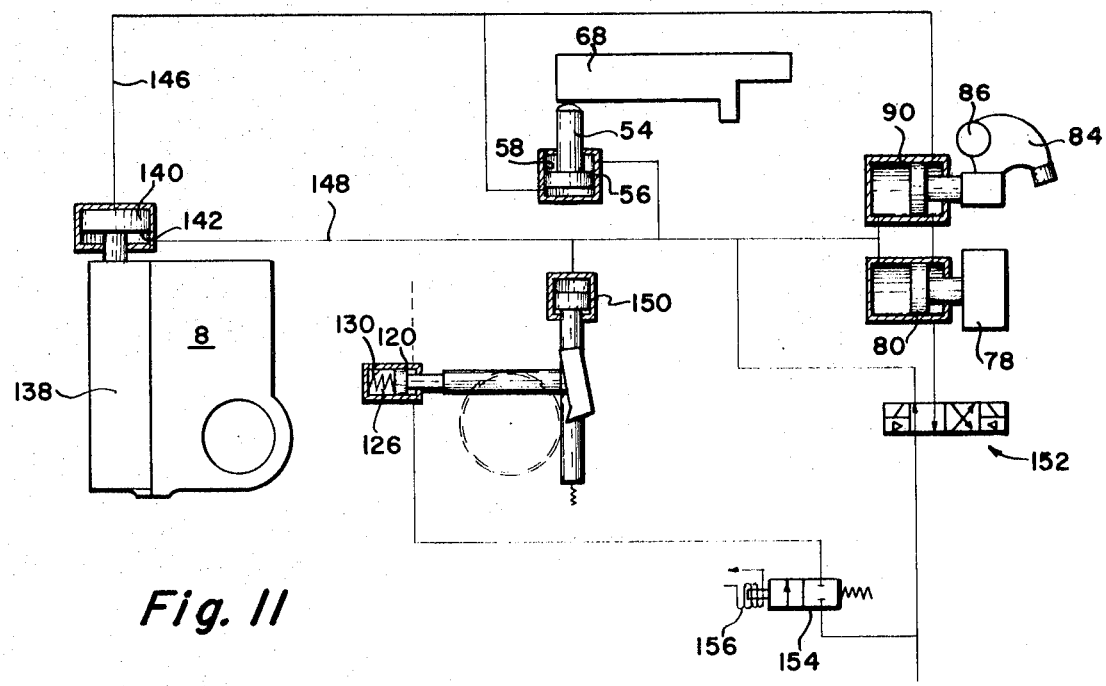
FIG. 11 is a schematic illustration of the pneumatic circuitry of this invention.

FIG. 11 is a schematic illustration of the fluid circuitry for the present invention. In addition to the cylinders thus far described, there is shown a piston 150 which corresponds to piston 126 on U. S. Pat. No. 3,165,769. Since this piston forms no part of the present invention, it is included merely for completeness of the schematic.

A fourway control valve 152 corresponding to valve 70 in U. S. Pat. No. 3,165,769 is provided for directing fluid pressure to the proper sides of the various pistons 56, 80, 90, 120, 140 and 150. Twoway valve 154 is used to control the admission of fluid to piston 120. Valve 154 is controlled by solenoid 156.

OPERATION OF THE INVENTION

When the threading attachment is to be used, hydraulic fluid is admitted to cylinder 20 so as to retract piston rod 22. this brings chasing head 8, arm 10, bar 6, and follower 118 into their respective operative positions. When piston rod 22 reaches the end of its travel, limit switch 46 is closed and an electric signal is given to solenoid 156 so as to admit fluid to cylinder 130 through valve 154. This moves piston 120 and bar 124 to the right in FIG. 9. Simultaneously, a solenoid on valve 152 is energized, and valve 152 admits fluid to the remainder of the cylinders 56, 80, 90, 140 and 150. The manner in which the fluid is admitted is controlled by valve 152. When the fluid passes through valve 152, piston 56 urges plunger 54 against clamping arm 68 to secure the chasing head 8 in position. Also fluid is admitted to cylinder 142 and the cutter slide mechanism 138 is forced downwardly towards the workpiece W. Fluid is also admitted to pistons 80 and 90 and arm 10 is clamped in its operative position in this manner.

Upon completion of the cycle, an electric signal is given by switch 108 when projection 96 engages stop 102. This signal will actuate the cut deepening mechanism to increase the depth of cut for the subsequent cycle in the manner described in U. S. Pat. No. 3,165,769.

After the threads have been cut to the desired depth in work piece W and the thread cutting operation is completed, fourway control valve 152 is shifted automatically to move pistons 56, 80, 90, 120, 140 and 150 to their inoperative positions. Subsequently, fluid is admitted to the upper side of piston 18 forcing piston 18 and piston rod 22 down. As described earlier, this extension of piston rod 22 causes rotation of bar 6, chasing head 8, arm 10 and follower arm 116 to their inoperative positions.

Thus the complete threading operation is carried out automatically when an electrical signal is given from the machine program to begin the operation.

While the invention has been described in connection with different embodiments thereof it will be understood that it is capable of further modification, and this application is intended to cover any variations, uses, or adaptations of the inventions following, in general, the principals of the invention and including such departures from the present disclosure as come within known or customary practice in the art to which the invention pertains, and as may be applied to the essential features hereinbefore set forth and fall within the scope of the invention or the limits of the appended claims.

What we claim is:

1. In a device for automatically positioning a threading attachment for a lathe having a spindle, spindle drive means, a lead screw mounted on said spindle, a bar mounted on said lathe and extending parallel to said spindle, a follower connected with said bar and movable into mesh with said lead screw for imparting lengthwise motion to said bar, a head secured to said bar, a cutting tool mounted on said head, and an arm member secured to said bar, the invention which includes:
- a. a bearing support member on said lathe for said bar,
- b. said arm member, said bar, and said head each having an operative and inoperative position,
- c. piston and cylinder means connecting said bearing support member and said arm member for rotating said arm member, said bar, and said head about the axis of said bar between said operative and said inoperative positions,
- d. fluid supply means for said piston and cylinder means,
- e. said piston and cylinder means including a piston rod secured to said piston means and one of said members,
- f. said cylinder means being connected to the other of said members,
- g. means associated with said piston and cylinder means for providing an electric signal at each end of the travel of said piston means, and
- h. means responsive to said signal when said head is in the operative position to initiate and maintain a threading cycle.

2. In a device as in claim 1 and wherein said means for providing an electric signal includes
- a. a collar secured to said piston rod for movement therewith,
- b. a rod in close proximity to said piston and having stops thereon for engagement with said collar, and
- c. limit switches closed by said rod at opposite ends of the movement of said piston rod.

3. In a device as in claim 2 and including:
- a. spring means against which said rod moves, and
- b. a trip block mounted on said rod for closing said limit switches.

4. In a device as in claim 3 and including:
- a. a plunger means in said head engageable with said bearing support means, and
- b. second piston means for urging said plunger into engagement with said bearing support means for clamping said head in position.

5. In a device as in claim 4 and wherein:
- a. said limit switches include control means for controlling the actuation of said second piston means.

6. In a device as in claim 5 wherein:
- a. said limit means include control means for controlling the initiation of a cutting cycle.

7. In a device as in claim 3 and including:
- a. means on said head for controlling the cutting depth of said cutting tool,
- b. means associated with said controlling means for initiating a cutting tool,
- c. said cutting cycle initiating means being actuated by said limit switches.

8. In a device as in claim 7 and wherein:
- a. said cutting cycle initiating means includes third piston means, and
- b. said third piston means is actuated by said limit switches.

8. In a device as in claim 8 and including:
- a. a solenoid valve for admitting fluid to said third piston means, and
- b. said limit switches actuating said solenoid valve.

10. In a device as in claim 3 and wherein:
- a. said bearing support means includes a housing, and
- b. said housing encloses said piston and cylinder means and said limit switches.

11. In a device as in claim 10 and wherein:
- a. said piston and cylinder means includes a piston rod,
- b. said arm rotates about said bar in a plane parallel to said position rod and is laterally spaced from said piston rod, and including,
- c. pin means connecting said arm to said piston rod.

12. In a device as in claim 11 and including:
- a. a lost motion connection between said pin and said piston rod.

13. In a device as in claim 12 and wherein:
said lost motion connection includes a tapered, elongated slot on the end of said piston rod.

14. In a device as in claim 13 and wherein:
- a. said tapered, elongated slot provides a closer clearance with said pin at the center of said slot than at he ends of said slot.

15. In a device as in claim 14 and wherein:
said pin is in a larger end of said slot when in its operative position, and
- b. said pin is smaller end of the slot when in its operative position.

16. In a device as in claim 11 and including:
- a. means for cushioning the travel of said piston near the limits of the travel of said piston.

17. in a device as in claim 16 and wherein:
- a. said means for cushioning the travel of said piston includes tapered bushing means on said piston rod adjacent each face of said piston,
- b. an annular recess adjacent each end of said cylinder means,
- c. whereby fluid is gradually metered through said recesses at the limits of travel of said piston.